US006471177B1

(12) United States Patent
Emrick et al.

(10) Patent No.: US 6,471,177 B1
(45) Date of Patent: Oct. 29, 2002

(54) BREAK-AWAY BRACKET FOR MOUNTING WINDOW COVERING COMPONENTS

(75) Inventors: Glenn Emrick, Allen, MI (US); James L. Daniels, Freeport, IL (US); W. Kenneth Saylor, Colon, MI (US); Drew A. Schubert, Freeport, IL (US)

(73) Assignee: Newell Window Furnishings, Sturgis, MI (US)

( * ) Notice: Subject to any disclaimer, the term of this patent is extended or adjusted under 35 U.S.C. 154(b) by 0 days.

(21) Appl. No.: 09/837,994

(22) Filed: Apr. 19, 2001

(51) Int. Cl.[7] ................................................ F16M 13/00

(52) U.S. Cl. ....................................... 248/544; 248/548

(58) Field of Search ................................ 248/548, 252, 248/254, 900, 909, 549, 262

(56) References Cited

U.S. PATENT DOCUMENTS

| | | | | | |
|---|---|---|---|---|---|
| 375,412 | A | * | 12/1887 | Creque | 248/909 |
| 1,581,805 | A | | 4/1926 | Kirsch | |
| 2,111,357 | A | * | 3/1938 | Cornell, Jr. | 248/909 |
| 2,439,091 | A | | 4/1948 | Keating | 248/27 |
| 2,752,991 | A | | 7/1956 | Charbonneau | 160/34 |
| 2,916,159 | A | | 12/1959 | O'Neill | 211/89 |
| 2,927,762 | A | | 3/1960 | Owsiak | 248/262 |
| 3,131,901 | A | | 5/1964 | Coleman | 248/226 |
| 3,218,017 | A | | 11/1965 | Butler | 248/263 |
| 3,384,987 | A | | 5/1968 | Prechtl | 40/152.1 |
| 3,567,261 | A | | 3/1971 | Akczinski | 287/64 |
| 3,860,119 | A | | 1/1975 | Irvine et al. | 211/45 |
| 3,999,663 | A | | 12/1976 | Walter et al. | 211/175 |
| 4,079,838 | A | * | 3/1978 | Granum | 211/26 |
| 4,149,692 | A | | 4/1979 | Califano | 248/225.2 |
| 4,216,936 | A | | 8/1980 | DeSelms | 248/460 |
| 4,226,395 | A | | 10/1980 | Bellinger | 248/263 |
| 4,246,710 | A | | 1/1981 | Mixer | 40/16.4 |
| 4,283,034 | A | | 8/1981 | Sheehan | 248/263 |
| 4,318,528 | A | | 3/1982 | Dobson | 248/475 R |
| 4,567,930 | A | | 2/1986 | Fischer | 160/166 R |
| 4,762,162 | A | | 8/1988 | Chochrek | 160/323.1 |
| 4,993,670 | A | | 2/1991 | Tesar | 248/68.1 |
| 5,040,316 | A | | 8/1991 | Fast | 40/124.4 |
| 5,127,459 | A | | 7/1992 | Markowitz | 160/263 |
| 5,209,444 | A | | 5/1993 | Rinderer | 248/205.1 |
| 5,421,551 | A | | 6/1995 | LeClaire | 248/257 |
| 5,615,850 | A | * | 4/1997 | Clonginger | 248/68.1 |

FOREIGN PATENT DOCUMENTS

| | | | | |
|---|---|---|---|---|
| DE | 2447907 | * | 4/1976 | 248/909 |

* cited by examiner

*Primary Examiner*—Kimberly Wood
(74) *Attorney, Agent, or Firm*—Marshall, Gerstein & Borun

(57) ABSTRACT

A break-away bracket for mounting and supporting window coverings has a mounting base and one or more break-away segments. The segments are interconnected end to end along frangible connections and extend from the mounting base. Each of the one or more break-away segments has a support element extending from one end. A most distal one of the support elements is exposed for supporting or mounting window coverings. Upon removal of the most distal one of the break-away segments or removal of more than one of the segments, a next adjacent one of the support elements becomes exposed for supporting or mounting window coverings.

26 Claims, 4 Drawing Sheets

BREAK-AWAY BRACKET FOR MOUNTING WINDOW COVERING COMPONENTS

FIELD OF THE INVENTION

The invention is generally related to mounting hardware, and more particularly to a break-away bracket for mounting window shades, curtain rods, and the like.

BACKGROUND OF THE INVENTION

There are countless different kinds of bracket hardware for mounting or hanging window coverings such as shades, blinds, curtain rods, and the like. Many of the hardware designs are fabricated having a number of components including a mounting base for securing the hardware to a surface, and a support bracket for supporting the window covering components. The mounting base and support bracket are typically fabricated separately and provided as a loose assembly to the consumer. The consumer then must install the hardware, adjust the support bracket position, and secure the mounting base and support bracket together. The assembly typically also requires more components such as fasteners for mounting the hardware and also for securing the components together. The installation process can therefore be quite cumbersome. In addition, the parts can be relatively costly to manufacture. In some cases, the parts are provided separately tot eh consumer, who must then assemble the components prior to installation.

A number of these designs are also adjustable in length to permit the installer to hang the window coverings at a desired distance from the wall surface. Most of these bracket designs also utilize at least two separate components that are slidable relative to one another to yield the length adjustability. However, several of these known length adjustable bracket designs are fabricated having only a single component for each bracket.

For example, U.S. Pat. No. 4,762,162 discloses a unitary hardware bracket for mounting window shades. The bracket is length adjustable by snapping or breaking off portions of the mounting end of the bracket. The mounting end can be shortened by breaking off one section of mounting holes and tangs. Another set of holes and tangs is left behind for mounting the bracket.

U.S. Pat. No. 2,752,991 discloses a window cornice mounting bracket assembly that also can be length adjusted at the mounting end by snapping off pieces of the bracket. However, each bracket disclosed in the '991 patent includes two separate components for securing the bracket and cornice in place.

Each of these bracket designs uses the same exposed support element or fixed projection at the support end of the bracket, regardless of bracket length and regardless of which portions of the bracket have been removed to adjust its length. The mounting end of these brackets is instead altered upon each length reduction.

Another problem with many current mounting hardware designs is that the brackets come only with fixed projections. A number of different bracket projection options are typically offered by a retailer. In many cases, a retailer will offer four similar brackets having differing projections. The consumer must select the proper one, take it home, and install it. Many times, the selected bracket and projection is either too short or too long for a particular job. For example, the consumer may be installing a curtain rod over a window that already has a blind installed. The curtain rod may need to extend further from the wall surface than the blind mounting brackets. The consumer therefore must either select the correct brackets, or, if not, must return to the store, return the incorrect brackets, and re-purchase the correct brackets.

A retailer must also stock and keep track of each of the bracket options in the store. Retailers typically stock, store, display, and track sales of products according to SKU numbers. Having four different brackets requires storage and shelf space for four different products as well as tracking four different SKU numbers. This simply adds cost and complexity for the retailer.

BRIEF DESCRIPTION OF THE DRAWINGS

Exemplary brackets constructed in accordance with the teachings of the present invention are described and explained in greater detail below with the aid of the drawing figures in which.

DETAILED DESCRIPTION OF THE PREFERRED EMBODIMENTS

Figure 1:
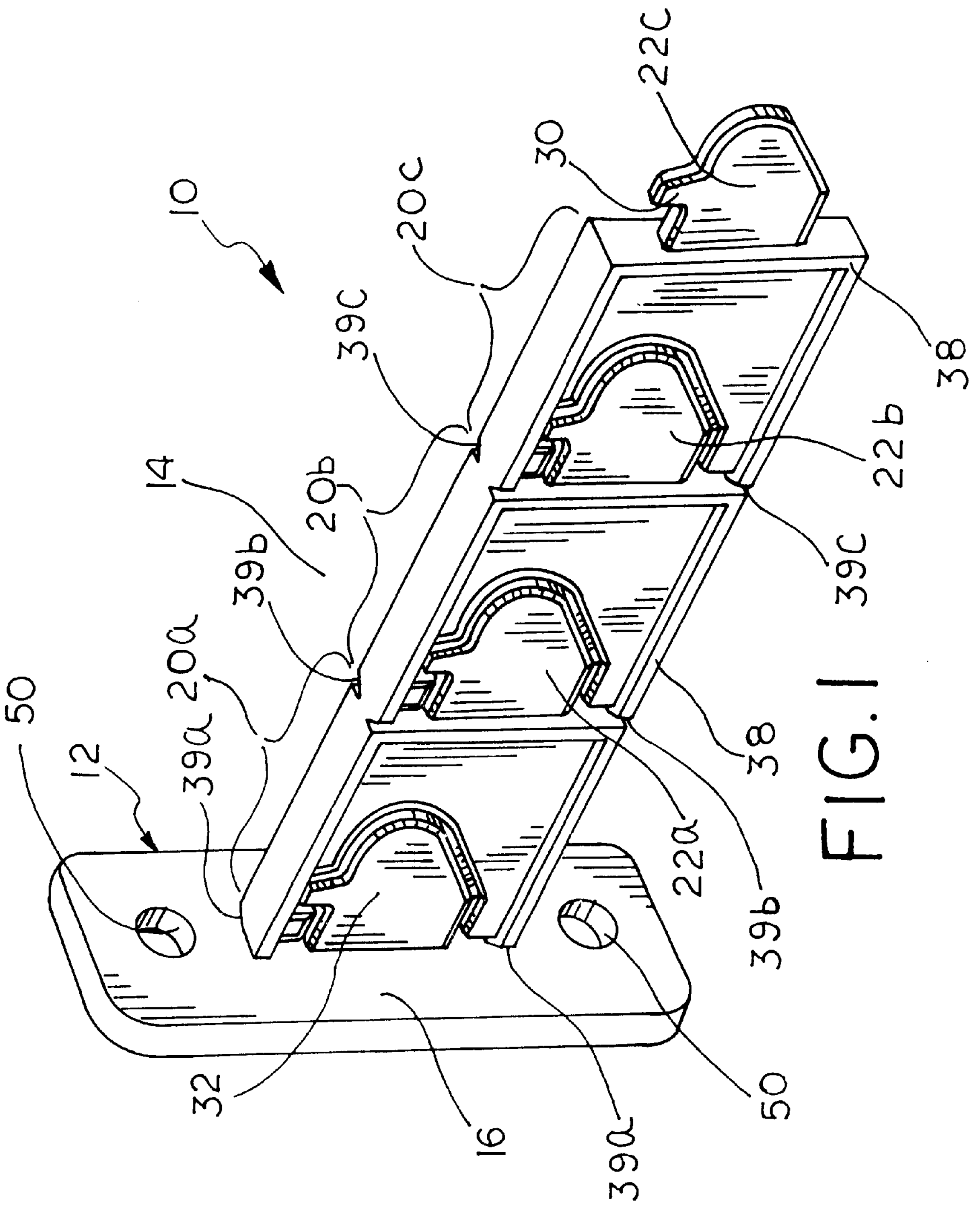
FIG. 1 is a perspective view of one example of a break-away bracket constructed according to the teachings of the present invention.
Figure 3:
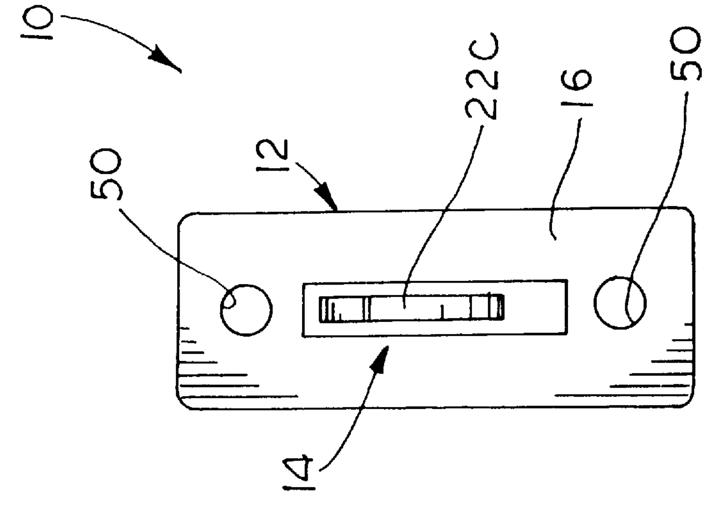
FIG. 3 is a front end view of the break-away bracket shown in FIG. 1.
Figure 2:
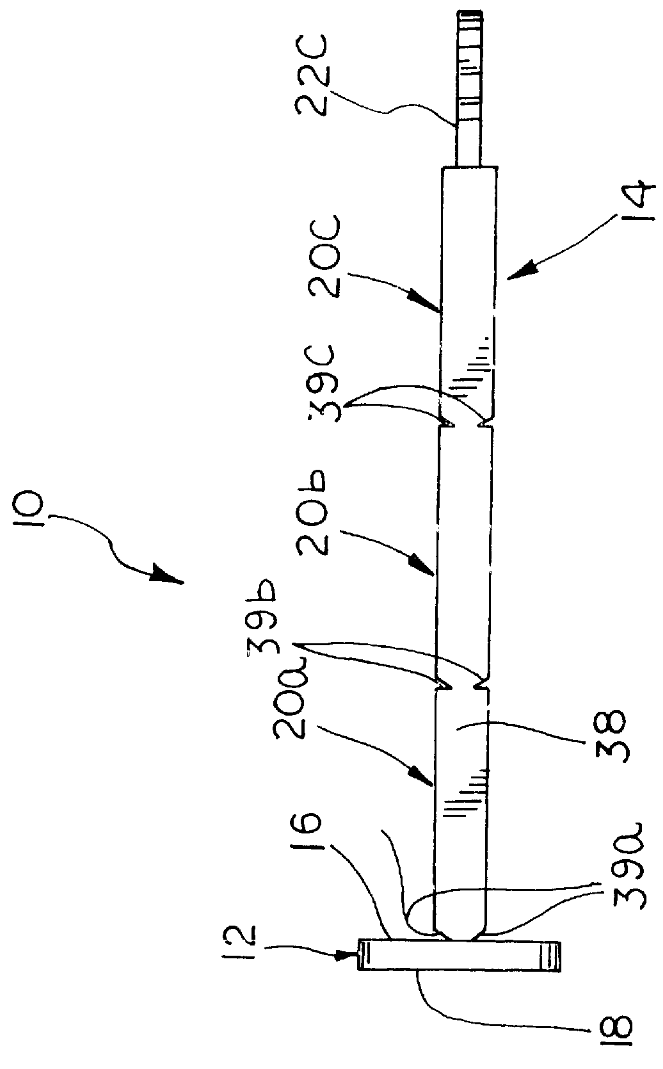
FIG. 2 is a top view of the break-away bracket shown in FIG. 1.

Various terminology is utilized herein to assist in describing the construction of the disclosed exemplary mounting bracket constructed according to the teachings of the present invention. The term "proximal" is utilized herein to describe the relationship between a mounting base portion and various support elements and element portions of the mounting bracket. Similarly, the term "distal" is utilized herein to describe the relationship between the mounting base portion and various support elements and element portions of the mounting bracket. The term "proximal", as used herein, refers to elements being nearer or more closely spaced to the mounting base. The term "distal", as used herein, refers to elements being further or more distantly spaced relative to the mounting base.

Referring now the drawings, FIGS. 1–4 generally illustrate one example of a mounting bracket 10 constructed according to the teachings of the present invention. The mounting bracket 10 generally has a mounting base 12 and a support section 14 extending from a support side 16 of the mounting base. The support section 14 is oriented generally normal or perpendicular to the mounting base 12 in this disclosed example, although other orientations are certainly permissible. The mounting base 12 also has a mounting side 18 adapted to secure or mount the bracket 10 to a surface, such as a wall or trim surface near a window.

As will be evident to those of ordinary skill in the art, the size, shape, and contour of both the mounting base 12 and support section 14 can vary considerably and yet fall within the scope of the present invention. Each particular mounting bracket constructed according to the teachings of the present invention and produced for supporting window covering components such as a curtain rod, a window shade, or the like, can be designed to accommodate various window, hardware component, and window covering sizes and shapes, interior design and decoration perimeters, and overall size restrictions. Further, the break-away mounting bracket 10, as is described in greater detail, is intended for selectively adjusting the distance between a mounting surface and a window covering component that is supported by the bracket. The size, shape, and configuration of the various support segment components described below can therefore also vary and yet remain within the scope of the invention.

In general, the support section 14 has a plurality of break-away segments 20 interconnected end to end with one another and extending from the support side 16 of the mounting base. The number of segments 20 can vary depending upon the characteristics needed for a particular application of the mounting bracket. In the present disclosed example, three removable or break-away segments 20*a*, 20*b*, and 20*c* are illustrated. The segment 20*a* is identified as the most proximal break-away segment since it is disposed nearest the support side 16 of the mounting base 12. The segment 20*b* is identified herein as an intermediate break-away segment since it is disposed adjacent the proximal segment 20*a* and is intermediate other more distal segments. The segment 20*c* is identified herein as the most distal break-away segment since it is the last exposed segment of the support section 14. The most distal segment 20*c* can be utilized to support a window covering component or can be removed as needed to expose a next adjacent segment.

In one alternative example, the disclosed mounting bracket 10 can include a plurality of the intermediate segments 20*b* to increase the overall or maximum length of the mounting bracket and support section as well as to provide further length adjustment options for the bracket. In a still further alternative example, the mounting bracket can also include only the most proximal segment 20*a* and the most distal segment 20*c*, without any intermediate segments 20*b*, if such a simple design is desired. In another alternative example of the mounting bracket, the bracket can also include only a single break-away segment 20*a*, without any other segments 20*b* or 20*c*, if so desired for applications that require selection from only two bracket lengths as described below.

In the disclosed example, each of the break-away segments 20 includes a support element 22 that is adapted to support or connect to a window covering component in a suitable manner, as is known to those of ordinary skill in the art. In the disclosed example, the support elements 22 each include a body generally having a top surface 24, an end surface 26, a bottom surface 28, and an edge 29 integrally attached to its corresponding segment 20. Each of the support elements 22 also has an upturned or upwardly extending tab 30 that is intended for being received in a corresponding notch or the like in a window covering component. The end surface 26 of each support element 20 is curved and tapered inward toward the body of the segment 20 moving downwardly toward the bottom surface 28. In this configuration, the window covering component can be accepted over the support element 22 in a known manner and held in place by the upwardly extending tab 30.

Figure 4:
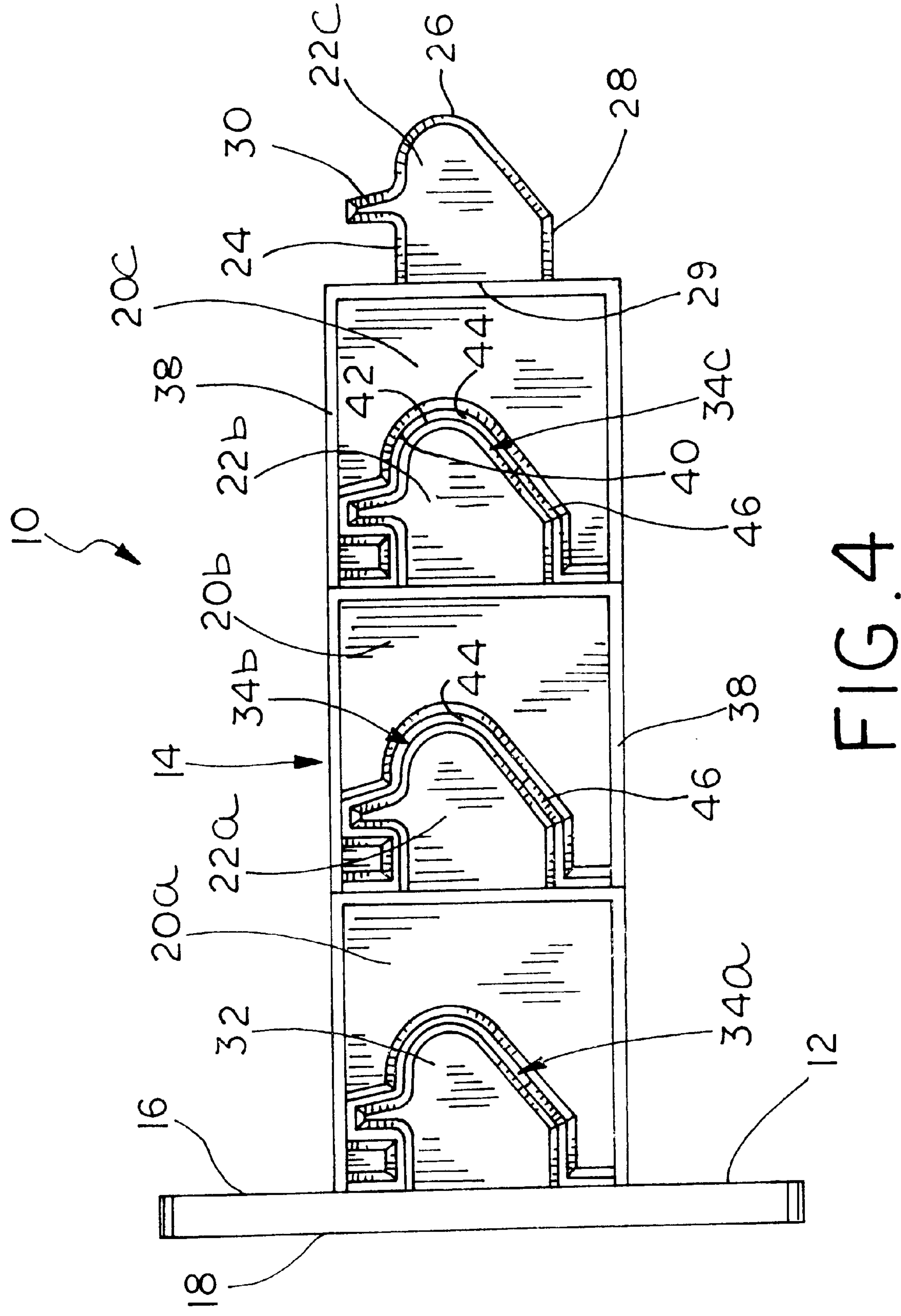
FIG. 4 is a side view of the break-away bracket shown in FIG. 1.

As illustrated in FIG. 4, a distal end of each of the segments 20 as a support element 22 integrally attached and extending therefrom. With such a construction, the most distal segment 20*c* includes an integral and exposed most distal support element 22*c*. The one or more intermediate segments 20*b* each include an intermediate support element 22*b* and the most proximal segment 20*a* includes an integral support element 22*a*.

In the disclosed example, the mounting base 12 also has a separate, fixed support element 32 that is fixed or integral with the support side 16 of the mounting base. Upon removal of the most proximal break-away segment 20*a*, the fixed support element 32 becomes exposed for mounting and supporting a window covering component. In an alternative example of the mounting bracket 10 according to the teachings of the present invention, the most proximal segment 20*a* can be integral with and not removable from the mounting base 12, and as such would not be a break-away segment. In such a construction, the fixed support element 32 would not be present, and thus, the most proximal support element 22*a* would be the last remaining exposed support element.

The mounting bracket 10 according to the present invention, in one preferred example, is molded from a plastic or thermoplastic material for ease of construction, cost considerations, and strength characteristics. Various plastics are known as suitable materials that can be formed having frangible connections which, upon bending along the frangible connection one or more times, can be broken or separated along the connection into two or more sections.

The break-away or removable segments 20 of the support section 14 disclosed herein are intended to be individually separable from one another, as needed, to alter the length of the mounting bracket 10. The proximal end of each of the individual segments 20*a*, 20*b*, and 20*c* incorporate a frangible connection, as disclosed herein, to the next adjacent segment, or in the case of the most proximal segment 20*a*, to the mounting base 12. A break line or frangible connection 34 is therefore provided separating each of the segments from one another, or, in the case of the most proximal segment 20*a*, from the mounting base 12. Each frangible connection 34 is a break line separating portions of adjacent segments 20 from one another and also separating portions a segment and a next adjacent support elements 22. A portion of each break line or frangible connection 34 therefore defines the contour of one support element 22 which, upon removal of the adjacent distal one of the segments 20, becomes exposed for use.

Figure 6:
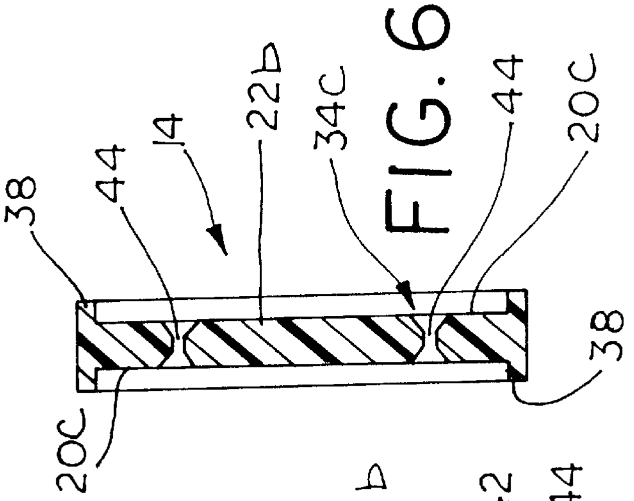
FIG. 6 is a cross section taken along line VI—VI of one of the segments shown in the enlarged view of FIG. 5.
Figure 7:
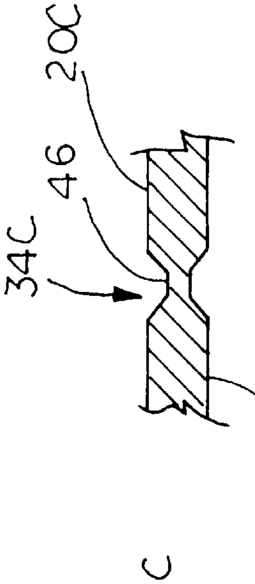
FIG. 7 is a cross section taken along line VII—VII of one of the segments shown in the enlarged view of FIG. 5.
Figure 5:
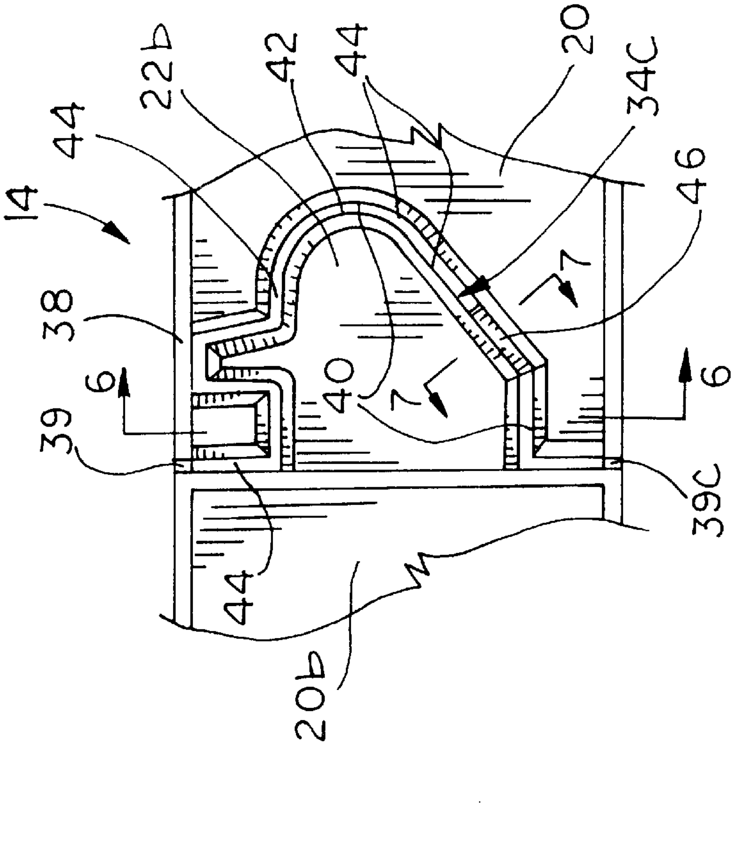
FIG. 5 is an enlarged side view of part of two break-away segments of the break-away bracket shown in FIG. 4.
Figure 8:
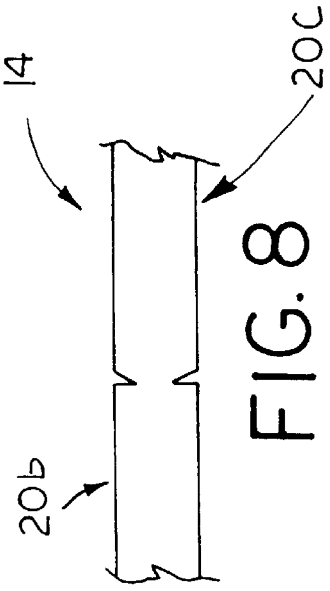
FIG. 8 is an enlarged view of part of the top of the break-away bracket shown in FIG. 2.

Referring now to FIGS. 5–8, details of the break line or frangible connection 34 are illustrated. Certain of these details are described below referring to a portion of only one of the segments or referring generally to the corresponding portion of all of the segments generally. When referring to only a portion of one segment, that description can refer equally to the corresponding portion of the other segments as well. FIG. 5 shows an enlarged side view of a portion of two adjacent segments including the most distal segment 20*c* and the next adjacent intermediate segment 20*b*. The frangible connection 34 is shown in greater detail in FIG. 5 between these two segments and is identified as frangible connection 34*c*. FIG. 6 is a cross section taken along one portion of the frangible connection 34*c* at line VI—VI. FIG. 7 is a cross section taken along a different portion of the connection 34*c* at line VII—VII. FIG. 8 illustrates a top view of the bracket 10 and the frangible connection 34*c*.

The disclosed mounting bracket includes a strengthening rib 38 formed around a perimeter of the support section 14 and also along portions of each of the segments 20. A portion of each frangible connection 34*a*, 34*b*, and 34*c* includes a pair of integral webs 39*a*, 39*b*, and 39*c*, one each provided at the top and bottom of the support section 14 in the rib 38. Each pair of the webs 39*a*, 39*b*, and 39*c* positionally coincides with the respective frangible connection 34*a*, 34*b*, and 34*c*. To form the webs 39, a notch or partial cutout can be provided on opposed edges of the rib 38 to reducing the thickness or width of the rib. Each pair of the webs 39 permits separation of adjacent segments at the appropriate parts of the thicker and wider material of the rib 38. The webs are best shown in FIGS. 1 and 8.

As shown in FIGS. 5 and 6, the frangible connection 34*c* includes a first edge 40 carried on one of the adjacent segments 20*c* and a second edge 42 carried on the adjacent support element 22*b* and segment 20*b*. The edges 40 and 42 in the present example are chamfered or beveled to better facilitate molding of the bracket 10. As shown in the example of FIGS. 5 and 6, one or more portions of the frangible connection 34 have a space or a gap 44 between the opposed edges 40 and 42. The two adjacent segments are therefore already completely separated at the locations of the gap 44. The frangible connection can include no gap 44, an intermittent gap, or only a single continuous gap extending over part of the connection, as desired.

As shown in FIG. 7, one or more supplemental webs 46 can be provided spanning the gap 44 between the segment 20*c* and the support element 22*b* and segment 20*b*. Each supplemental web 46 is a reduced thickness area of the bracket material. The webs 46 span the gap 44 and interconnect the edges 40 and 42 at each web location. One or more of the supplemental webs 46 can be provided along the frangible connection 34*c*. A plurality of intermittent spaced supplemental webs 46 can be provided along the connection. A single web 46 can alternatively be used that extends over only part of the connection (as shown) or that extends essentially over the entire length of the connection. if the mounting bracket 10 is intended to support relatively light weight window covering components, the supplemental web 46 can be completely eliminated. In such an example, webs 39*c* at the rib 38 would be the only frangible portion of the connection 34*c*.

By bending the most distal segment 20*c* along the frangible connection 34*c*, the webs 39 and the supplemental web or webs 46, if present, will fracture or fail to separate the segment 20*c* from the segment 20*b*. Once broken away, the entire segment 20*c* is removed from the remainder of the mounting bracket to expose the support element 22*b* and segment 20*b*.

The disclosed mounting bracket 10 can be mounted using fasteners inserted through the mounting openings 50 either before or after breaking away desired segments of the mounting bracket. To adjust the length of the mounting bracket, a user determines the desired position of the support element 22. Once determined, the unneeded segment or segments 20 are removed along the appropriate frangible connection 34 and discarded. The next exposed support element 22 is then utilized for supporting a window covering component.

The disclosed mounting bracket 10 has a plurality of identical segments and support elements. In other examples, each segment and/or each support element can be different in configuration. One segment can be adapted to support one type of window covering component that, when removed, exposes another segment adapted to support a different type of window covering component. The break-away bracket disclosed herein can typically be used to support curtain rod for hanging curtains. Two or more brackets, at least one on each end of the rod, can be used to support the rod. The disclosed bracket, however, is not limited to such use. The mounting base and the support section including the support elements can be modified to support other types of window coverings and hardware components as well.

Although certain break-away brackets have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A mounting bracket for supporting window covering components, the mounting bracket comprising;

a mounting base; and a support section extending from the mounting base, the support section having a first unexposed support element extending from the mounting base, at least a most proximal break-away segment removably attached to the mounting base along a most proximal frangible connection, and an exposed support element, wherein at least a part of the most proximal frangible connection defines a shape of the first unexposed support element.

2. A mounting bracket according to claim 1, wherein the mounting base has an attachment side for attaching the mounting bracket to a surface, and a support side from which the support section extends.

3. A mounting bracket according to claim 1, wherein the support section is oriented generally perpendicular to the support surface of the mounting base.

4. A mounting bracket according to claim 1, wherein the exposed support element extends from the most proximal break-away segment which, when broken away, removes the exposed support element and exposes the first unexposed support element.

5. A mounting bracket according to claim 1, further comprising:

at least a second unexposed support element extending from the most proximal break-away segment; and a most distal frangible connection removably attaching a most distal break-away segment with the most proximal break-away segment and defining a shape of the second unexposed support element, wherein the exposed support element extends from the most distal break-away segment.

6. A mounting bracket according to claim 5, further comprising: at least one intermediate break-away segment disposed between the most proximal and the most distal break-away segments and being connected to each along respective frangible connections; and at least one unexposed intermediate support element extending from the at least one intermediate break-away segment and having a shape defined by at least part of a corresponding one of the respective frangible connections.

7. A mounting bracket according to claim 5, further comprising:

a plurality of intermediate break-away segments disposed end to end between the most proximal and the most distal break-away segments and being interconnected along respective intermediate frangible connections; and a plurality of intermediate unexposed support elements each extending from a corresponding one of the plurality of intermediate break-away segments and each having a shape defined by at least part of a corresponding one of the respective frangible connections.

8. A mounting bracket according to claim 1, wherein the mounting bracket is formed from a plastic material.

9. A mounting bracket according to claim 1, wherein the most proximal frangible connection includes one or more webs having a reduced material thickness in comparison to a material thickness of mounting bracket material directly adjacent the most proximal frangible connection.

10. A mounting bracket according to claim 9, wherein the most proximal frangible connection further includes one or more gaps in the one or more webs of the most proximal frangible connection.

11. A mounting bracket according to claim 10, further comprising:

a plurality of the webs and the gaps alternately interspersed over a length of the most proximal frangible connection.

12. A mounting bracket according to claim 1, further comprising:

a strengthening rib extending around a substantial portion of a perimeter of the support section and having a rib width; and a plurality of webs formed in the rib, each web reducing the rib width at a location on the support section corresponding to the most proximal frangible connection.

13. A mounting bracket for supporting window covering components, the mounting bracket comprising:

a mounting base;

a first unexposed support element affixed to the mounting base; and a plurality of break-away segments interconnected end to end along respective frangible connections and extending from the mounting base, each of the plurality of break-away segments having a support element extending from one end, and wherein a most distal support element is exposed, and wherein when a most distal one of the plurality of break-away segments is removed, the most distal support element is also removed and an adjacent unexposed support element becomes exposed.

14. A mounting bracket according to claim 13, further comprising:

a fixed support element extending from the mounting base that becomes exposed upon removal of a most proximal one of the plurality of break-away segments.

15. A mounting bracket according to claim 13, wherein each of the frangible connections includes one or more webs having a reduced material thickness in comparison to a material thickness of respective break-away segment material directly adjacent the frangible connection.

16. A mounting bracket according to claim 15, wherein each of the frangible connections further includes one or more gaps in the one or more webs of the frangible connection.

17. A mounting bracket according to claim 16, further comprising:

a plurality of the webs and the gaps alternately interspersed over a length of the frangible connection.

18. A mounting bracket according to claim 13, further comprising:

a strengthening rib extending around a substantial portion of a perimeter of the plurality of break-away segments and having a rib width; and a plurality of webs formed in the rib, each web reducing the rib width at a location on the rib corresponding to one of the respective frangible connections.

19. A mounting bracket for supporting window covering components, the mounting bracket comprising:

a mounting base for attaching the mounting bracket to a surface;

a segmented support section that extends from the mounting base and that has at least a distal segment removably attached to a portion of the support section along a frangible connection;

an exposed support element formed integral with and extending from a distal end of the distal segment; and at least one unexposed support element having a periphery that is at least partly encompassed by the frangible connection and that becomes exposed upon removing the distal segment along the frangible connection.

20. A mounting bracket according to claim 19, wherein the at least one unexposed support element is formed integral with and extending from the mounting base.

21. A mounting bracket according to claim 19, wherein the segmented support further comprises:

a plurality of intermediate segments disposed end to end between the mounting base and the distal segment and being removably interconnected along respective intermediate frangible connections; and plurality of intermediate unexposed support elements each extending from a corresponding one of the plurality of intermediate segments and each becoming exposed upon removing a next distally adjacent one of the segments along a respective one of the frangible connections.

22. A mounting bracket for supporting window covering components the mounting bracket comprising:

a mounting base;

at least a most proximal break-away segment removably attached to a portion of the mounting base along a most proximal frangible connection;

at least a first unexposed support element extending from the mounting base and having a periphery, wherein at least a portion of the most proximal frangible connection encompasses the periphery of the first unexposed support element; and an exposed support element.

23. A mounting bracket according to claim 22, wherein the most proximal break-away segment and first unexposed support element extend generally perpendicularly from a support surface of the mounting base.

24. A mounting bracket according to claim 22, wherein the exposed support element extends from the most proximal break-away segment, and wherein when the most proximal break-away segment is removed the exposed support element is also removed exposing the first unexposed support element.

25. A mounting bracket according to claim 22, further comprising:

a second unexposed support element extending from the most proximal break-away segment; and a more distal frangible connection removably attaching a more distal break-away segment to the most proximal break-away segment and encompassing a periphery of the second unexposed support element.

26. A mounting bracket according to claim 22, further comprising:

a plurality of break-away segments disposed end to end and removably attached to the most proximal break-away segment, the plurality of break-away segments being interconnected by respective frangible connections; and a plurality of unexposed support elements each having a periphery encompassed by a respective one of the frangible connections, the exposed support element extending from a most distal one of the plurality of break-away segments.

* * * * *